United States Patent [19]

Meyer

[11] Patent Number: 5,143,393
[45] Date of Patent: Sep. 1, 1992

[54] GOOSENECK TRAILER MOUNTING BALL INSTALLATION FOR PICK-UP TRUCK

[75] Inventor: Paul R. Meyer, Holton, Ind.

[73] Assignee: Una-Goose Company, Inc., Holton, Ind.

[21] Appl. No.: 672,171

[22] Filed: Mar. 19, 1991

[51] Int. Cl.⁵ .................. B60D 1/06; B60D 1/52
[52] U.S. Cl. ................... 280/491.1; 280/511; 280/901; 280/433; 280/495
[58] Field of Search ............... 280/901, 491.2, 491.5, 280/491.1, 433, 511, 495

[56] References Cited

U.S. PATENT DOCUMENTS

| | | | |
|---|---|---|---|
| 3,220,750 | 11/1965 | Mead | 280/901 X |
| 3,336,051 | 8/1967 | Dale | 280/901 X |
| 3,791,674 | 2/1974 | Berends | 280/433 |
| 3,893,713 | 7/1975 | Ivy | 280/511 |
| 4,256,324 | 3/1981 | Hamilton | 280/433 |
| 4,540,194 | 9/1985 | Dane | 280/491 |
| 4,546,994 | 10/1985 | Taylor | 280/423 |
| 4,570,966 | 2/1986 | Giboney et al. | 280/433 |
| 4,643,443 | 2/1987 | Husa | 280/511 X |
| 4,657,274 | 4/1987 | Mann et al. | 280/433 |
| 5,016,898 | 5/1991 | Works et al. | 280/901 X |

Primary Examiner—Charles A. Marmor
Assistant Examiner—Kevin Hurley
Attorney, Agent, or Firm—Woodard, Emhardt, Naughton, Moriarty & McNett

[57] ABSTRACT

An improved gooseneck trailer hitch assembly mounting to the frame and underneath the bed of a pick-up truck. Only the hitch extends into the cargo carrying space overlying the bed of the pick-up. The ball hitch is removable from its mounting when not in use to clear the bed of any obstructions. The mounting assembly for the hitch is adjustable to provide easy mounting to virtually any pick-up truck irrespective of frame width.

8 Claims, 3 Drawing Sheets

GOOSENECK TRAILER MOUNTING BALL INSTALLATION FOR PICK-UP TRUCK

BACKGROUND OF THE INVENTION

1. Field of the Invention

The present invention relates generally to trailer hitches for vehicles and, more particularly, to a ball coupling installation for a gooseneck type trailer hitch.

2. Description of the Prior Art

Ball type couplers for trailer hitches are well known in the art and commonly used on pick-up trucks to permit the hauling of trailers. Quite commonly, such couplers are mounted to the rear bumper of the pick-up truck. These bumpers have a more restricted load pulling capacity than the truck frame and for this reason coupling devices mounted in this fashion are disfavored over couplers mounted directly to the truck frame.

Couplers useful for gooseneck type trailer hitches are most favorably attached directly to the pick-up truck frame and positioned in the bed so that the gooseneck portion of the trailer can extend over the bed when coupled to the pick-up. Unfortunately, the ball and associated mounting assembly extending upwardly from the bed interferes with and restricts the loading of materials onto the bed. Various means have been employed to eliminate this problem, including retractable mechanisms for retracting the ball coupler below the bed when not in use. The retractable mechanisms have their own disadvantages, in that they undesirably complicate the coupler design as well as the procedures for mounting the mechanism to the pick-up. A yet further disadvantage with certain of these systems is that they are designed for pick-ups having frames of a particular width only and therefore cannot be mounted on pick-up trucks having different frame widths.

Each of the patents listed below relate generally to the field of trailer hitch devices:

| U.S. Pat. No. | Inventor |
| --- | --- |
| 3,791,674 | Berends |
| 3,893,713 | Ivy |
| 4,256,324 | Hamilton |
| 4,456,994 | Taylor |
| 4,540,194 | Dane |
| 4,570,966 | Giboney et al. |
| 4,657,274 | Mann et al. |

U.S. Pat. No. 3,791,674 to Berends discloses a retractable type kingpin assembly for mounting in the bed of a vehicle. The kingpin assembly is mounted to the bed of the vehicle by a support plate.

U.S. Pat. No. 3,893,713 to Ivy discloses a coupler for a gooseneck trailer hitch having a ball coupler at its end. The coupler is recessed into the bed of the vehicle and is secured thereto by a bed plate mounted to the frame of the truck by four carriage bolts projecting through holes formed in the bed plate.

U.S. Pat. No. 4,256,324 to Hamilton discloses a retractable ball hitch assembly mounted to the truck frame and positioned within the bed of the truck. The assembly mounts directly to the upper surfaces of the rails of the frame beneath the bed via four mounting holes in the web of the assembly.

U.S. Pat. No. 4,456,994 to Taylor discloses an interchangeable universal trailer hitch assembly which is adjustably secured to the truck via the frame and the bed. The hitch assembly includes tubular support members with sliding sleeves thereon which are apertured to permit adjustment for mounting in trucks having different frame widths. The trailer hitch is removable from the rest of the mounting assembly so that the bed area is unobstructed by the hitch. The design is disadvantaged by the need for a reinforcing bed plate which is mounted on top of the truck bed and the fact that adjustment of the support members and sleeves is limited to two positions.

U.S. Pat. No. 4,540,194 to Dane discloses a retractable ball type hitch which is mounted to the truck frame and positioned within the bed of the truck. The device includes a mounting plate which is apparently mounted within a hole in the bed so as to lie flush with the bed. If the mounting plate is not sized to permit direct mounting to the truck frame, the design requires the use of connecting rods welded between the hitch and the frame to mount the hitch to the truck frame.

U.S. Pat. No. 4,570,966 to Giboney et al. discloses a retractable ball type hitch which is retractably housed in a housing welded or bolted to the underside of the truck bed.

U.S. Pat. No. 4,657,274 to Mann et al. discloses a retractable ball type hitch which includes transverse frame members secured to the truck underneath the bed. Hinged covers secured to the bed cover the hitch when not in use.

SUMMARY OF THE INVENTION

A gooseneck trailer hitch assembly for mounting to the frame and underneath the bed of a pick-up truck, according to one embodiment of the present invention comprises a hitch and an installation sub-assembly for the hitch which is designed such that no portion of the installation sub-assembly extends into the space overlying the bed of the pick-up truck. The installation sub-assembly includes a support body having a sleeve for removably receiving the hitch. The sleeve is adapted to be positioned within an opening fashioned in the bed of the pick-up truck and extend vertically from the support body so as to lie no higher than substantially flush with the level of the bed. The installation sub-assembly further includes at least two connecting members slidably mounted in telescopic fashion to opposite sides of the support body and extending outwardly therefrom. Each of the connecting members includes means for fastening the connecting members to the frame of the pick-up truck. The relative extension of the connecting members from the support body is continuously adjustable within their range of movement.

It is an object of the present invention to provide an improved gooseneck trailer hitch assembly.

It is a further object of the present invention to provide an improved gooseneck trailer hitch assembly having an installation sub-assembly for the hitch which is designed such that no portion of the installation sub-assembly extends into the space overlying the bed of the pick-up truck.

A yet further object of the present invention is to provide an installation sub-assembly for the hitch which may be used with virtually any frame width commonly used for half ton, three quarter ton and one ton pick-up trucks.

An additional object of the present invention is to provide a gooseneck trailer hitch assembly which is mounted to the frame of a pick-up truck and minimizes the size of the hole which must be made in the bed of the truck to accommodate the hitch.

Related objects and advantages of the present invention will become more apparent by reference to the following figures and detailed description.

BREIF DESCRIPTION OF THE DRAWINGS

DESCRIPTION OF THE PREFERRED EMBODIMENT

Figure 1:
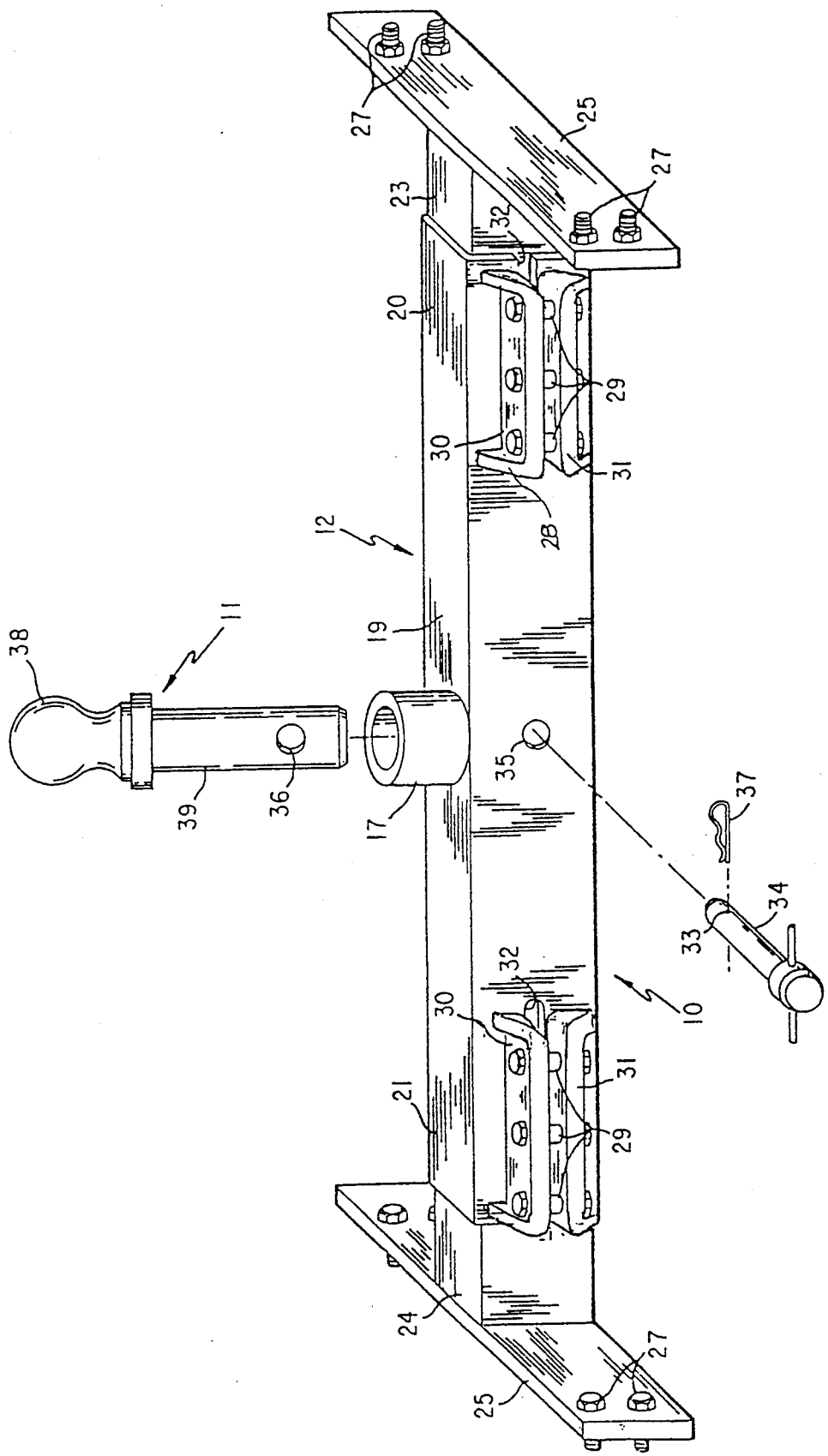
FIG. 1 is an exploded perspective view of the gooseneck trailer hitch assembly of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Referring to the drawings in detail, the gooseneck trailer hitch assembly of the present invention is shown generally designated at 10. The assembly 10 includes a ball type hitch 11 and mounting sub-assembly 12.

Figure 2:
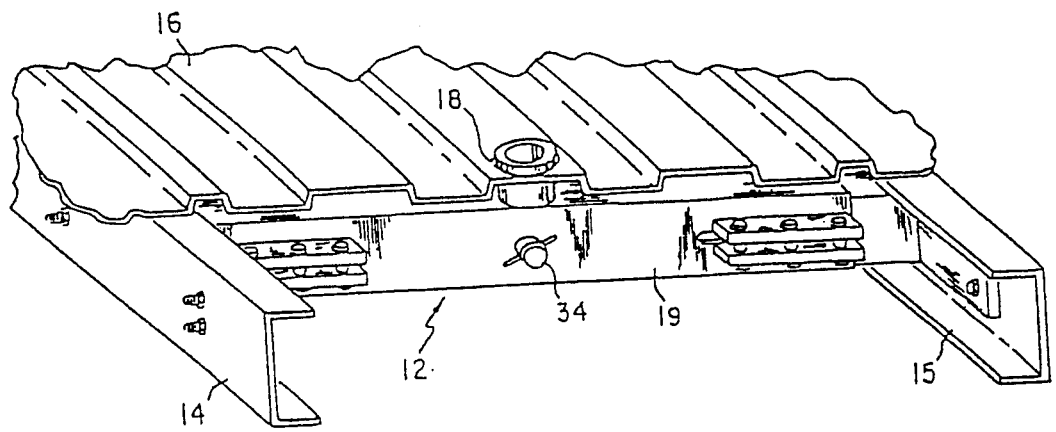
FIG. 2 is a fragmentary perspective view of the gooseneck trailer hitch assembly of FIG. 1 without the ball hitch, shown in its mounted position underneath the bed of a pick-up truck.
Figure 3:
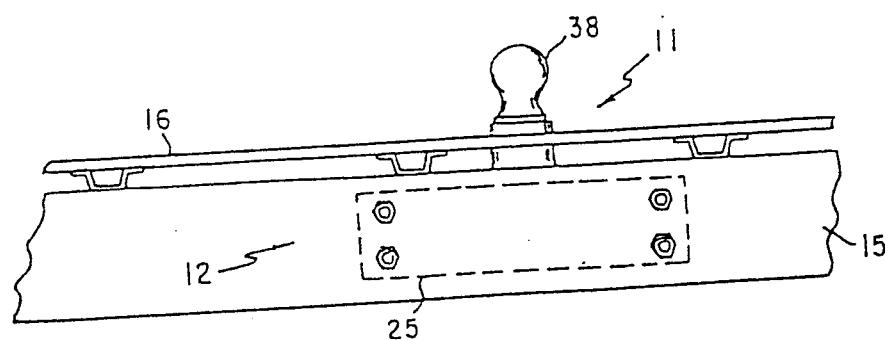
FIG. 3 is a fragmentary side view schematically depicting the gooseneck trailer hitch assembly of FIG. 1, including the ball hitch, shown in its mounted position on a pick-up truck.

As seen in FIGS. 2 and 3, the sub-assembly 12 is adapted to mount directly to the frame rails 14 and 15 which run lengthwise beneath the bed 16 of a typical pick-up truck. The hitch 11 is slidably and removably mounted to sub-assembly 12 within a tubular sleeve 17 which extends upwardly into a hole 18 formed in the bed 16. Preferably, the top of sleeve 17 is substantially flush with the level of the bed 16 so as not to provide any obstruction within bed 16 when the hitch 11 is removed.

Referring particularly to FIG. 1, the sub-assembly 12 includes a support body 19, opposite sides of which form horizontally extending sleeves 20 and 21. Tubular sleeve 17 extends upwardly from body 19 and is integrally formed therewith. Connecting members 23 and 24 are telescopically received for slidable movement in sleeves 20 and 21, respectively. Rigidly affixed to the outer end of each connecting member is a vertically extending mounting plate 25. Each of the mounting plates 25 has four mounting holes which align with a similar number of mounting holes in frame rails 14 and 15. Bolt and nut combinations 27 are the preferred fastening means for securing the mounting plates to the vertically extending leg portion of rails 14 and 15.

The relative extension of connecting members 23 and 24 from sleeves 20 and 21 is continuously adjustable within the range of their movement so as to permit sub-assembly 12 to be mounted to virtually any frame width pick-up truck. The connecting members are secured in position after adjustment by tightening bolt and nut fasteners 29 mounted to upper and lower flanges 30 and 31 integrally fixed to and extending from support body 19 along the length of slots 32. Each of the flanges 30 and 31 have gussets 28 at each end which reinforce and strengthen their mounting to support body 19.

Hitch 11 is locked to sub-assembly 12 by a retaining pin 34 which mounts through a hole 35 in support body 19 and a hole 36 in hitch 11. A cotter pin 37 is inserted through a hole 33 in retaining pin 34 to secure the pin 34 in place.

Figure 4:
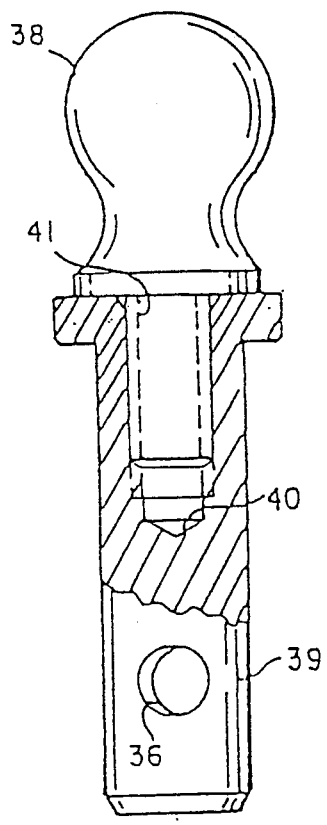
FIG. 4 is an elevation view, partially in section, showing the construction of the ball hitch.

Referring now to FIGS. 1 and 4, the hitch 11 is preferably formed as a two-piece unit consisting of hitch ball 38 and post 39. The post 39 has an internally threaded opening 40 for receiving an integral threaded stud 41 on the bottom of the ball 38, in screw engagement. It should be understood that while a ball type hitch is shown, other types of hitch couplers may also be employed.

The assembly 10 of the present invention provides greatly simplified installation to standard type pick-up trucks. Because the sub-assembly 12 provides continuous lateral adjustment of the mounting plates 25, there is no need to provide special sizes for each width frame. Mounting is accomplished as follows: a hole is formed in the bed 16 slightly larger than the size of tubular sleeve 17. Four mounting holes are drilled into each of the frame rails so as to align with the mounting holes in plates 25. The relative extension of connecting members 23 and 24 from sleeves 20 and 21 is adjusted to correspond to the spacing between the frame rails and bolt and nut fasteners 29 are tightened to secure the connecting members in place. The sub-assembly 12 is then mounted to the frame rails via bolt and nut combinations 27.

It may be appreciated that because the bolt and nut combinations 27 secure to the side walls of the frame rails they do not extend into the cargo carrying area of the bed, and the need for forming additional holes in the bed to accommodate mounting bolts is eliminated. Further, only one hole is formed in the bed and its size is relatively small since it need only be large enough to accommodate tubular sleeve 17. This serves to keep the bed relatively intact and minimizes any loss of structural rigidity, further simplifying the construction of the installation sub-assembly 12.

While specific dimensions may be varied, in the embodiment depicted the support body is formed of 3 and $\frac{1}{4}''$ square steel tubing having a thickness of $\frac{1}{4}''$ and a length of 28''. Further, the connecting members 23 and 24 are each formed of 3'' square steel tubing having a thickness of $\frac{1}{4}''$ and a length of 12''. In addition, the mounting plates 25 are each sized 3'' by 10'' and have a thickness of $\frac{1}{4}''$. The upper and lower flanges 30 and 31 are each sized 1'' by 5'' and have a thickness of $\frac{1}{4}''$ while the tubular sleeve 17 is formed of a suitable rigid metal tubing having an outside diameter of 3 and $\frac{3}{4}''$, an inside diameter of 2'' and a length of 6''. Pin 34 is machined from $\frac{3}{4}''$ steel while post 39 is machined to form from a 6'' length of solid 2 and $\frac{3}{4}''$ cold rolled steel.

The mounting of the structure to the frame rails assures that the structure of my invention supports the total load of the trailer tongue through the truck frame rails, avoiding any loading of the truck bed by the trailer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gooseneck trailer hitch assembly for mounting to the frame and underneath the bed of a pick-up truck, comprising:
   a hitch adapted to engage a mating coupling on a gooseneck type trailer; and
   an installation sub-assembly for mounting said hitch to the frame so that said hitch extends upwardly from the bed of the pick-up truck, including
   (a) a support body having a sleeve for removably receiving said hitch, said sleeve adapted to be positioned within an opening fashioned in the bed of the pick-up truck and extending vertically from said support body so as to lie no higher than substantially flush with the level of the bed, and
   (b) at least two connecting members slidably mounted in telescopic fashion to opposite sides of said support body and extending outwardly therefrom, each of said connecting members including means for fastening said connecting members to the frame of the pick-up truck, the relative extension of said connecting members from said support body being continuously adjustable within their range of movement,
   wherein no portion of said installation sub-assembly extends into the space overlying the bed of the pick-up truck.

2. The gooseneck trailer hitch assembly of claim 1 wherein said hitch is a ball type hitch including a hitch ball and a post threadably receiving said hitch ball, said post sized and formed so as to be slidably received within said sleeve.

3. The gooseneck trailer hitch assembly of claim 1 wherein said installation sub-assembly includes means for locking said hitch thereto.

4. The gooseneck trailer hitch assembly of claim 1 wherein said support body includes horizontally extending sleeves slidably receiving said connecting members therein, said sleeves including clamping means for clamping said connecting members in position relative to said sleeves.

5. The gooseneck trailer hitch assembly of claim 4 wherein said support body includes horizontally extending sleeves slidably receiving said connecting members therein, said sleeves being slotted along the length thereof, said support body further including upper and lower flanges extending along each of said slots and fastening means associated with said upper and lower flanges.

6. The gooseneck trailer hitch assembly of claim 5 wherein said hitch is a ball type hitch including a hitch ball and a post threadably receiving said hitch ball, said post sized and formed so as to be slidably received within said sleeve.

7. The gooseneck trailer hitch assembly of claim 6 wherein said installation sub-assembly includes means for locking said hitch thereto.

8. The gooseneck trailer hitch assembly of claim 1 wherein the pick-up truck has frame rails having vertically extending sides and said connecting members include vertically extending mounting plates adapted to mount to the sides of the frame rails.

* * * * *